United States Patent
Mangalaramanan et al.

(10) Patent No.: US 7,229,098 B2
(45) Date of Patent: Jun. 12, 2007

(54) FRAME RAIL TORSION ATTENUATOR

(75) Inventors: Sathya Prasad Mangalaramanan, Toledo, OH (US); James Christopher Ridge, Portage, MI (US); Michael Lee Zebolsky, Marshall, MI (US)

(73) Assignee: Dana Corporation, Toledo, OH (US)

( * ) Notice: Subject to any disclaimer, the term of this patent is extended or adjusted under 35 U.S.C. 154(b) by 333 days.

(21) Appl. No.: 10/727,067

(22) Filed: Dec. 3, 2003

(65) Prior Publication Data

US 2005/0121874 A1 Jun. 9, 2005

(51) Int. Cl.
*B62D 21/00* (2006.01)
*B62D 21/02* (2006.01)

(52) U.S. Cl. .................. 280/781; 280/788; 280/784; 267/273

(58) Field of Classification Search .............. 280/781, 280/793, 794, 788, 798, 800, 124.106, 124.107, 280/124.108, 784; 267/273, 278, 188; 244/125, 244/119, 30
See application file for complete search history.

(56) References Cited

U.S. PATENT DOCUMENTS

| | | | |
|---|---|---|---|
| 1,156,875 A | | 10/1915 | Bartlett |
| 1,641,324 A | * | 9/1927 | D Humy ................. 244/125 |
| 2,146,851 A | * | 2/1939 | Respess ................. 244/125 |
| 2,337,281 A | | 12/1943 | Sherman |
| 2,859,046 A | | 11/1958 | Easton |
| 3,488,019 A | * | 1/1970 | Sonstegaard ............. 244/30 |
| 3,689,054 A | | 9/1972 | Gouirand ............... 267/68 |
| 3,822,908 A | | 7/1974 | Gouirand ............... 293/68 |
| 3,879,051 A | * | 4/1975 | Kolbe ................... 280/86.751 |
| 3,995,799 A | * | 12/1976 | Bartolini ............... 244/16 |
| 4,289,214 A | * | 9/1981 | Spence ................. 180/234 |
| 4,770,420 A | * | 9/1988 | Gottwald et al. ........ 293/104 |
| 4,773,670 A | | 9/1988 | Raidel, II |
| 4,976,417 A | * | 12/1990 | Smith .................. 267/25 |
| 5,052,732 A | * | 10/1991 | Oplet et al. ............ 293/102 |
| 5,137,413 A | * | 8/1992 | Ressler ................. 414/474 |
| 5,348,251 A | * | 9/1994 | Ferguson ............... 244/30 |
| 5,836,598 A | * | 11/1998 | Parker et al. .......... 280/93.51 |

(Continued)

FOREIGN PATENT DOCUMENTS

WO  WO 95/06571  3/1995

(Continued)

OTHER PUBLICATIONS

Holland Neway AS-Series, R. V./Bus Air Steer Suspension AS-090/120/140, (c) 1999, 2 pps.

Primary Examiner—Paul N. Dickson
Assistant Examiner—George D. Spisich
(74) Attorney, Agent, or Firm—Dykema Gossett PLLC

(57) ABSTRACT

The present invention provides a torsion attenuator for a vehicle frame having first and second longitudinal frame rails extending substantially parallel to a longitudinal axis. A torsion attenuator in accordance with one embodiment of the present invention includes first and second brackets coupled to the first and second frame rails, respectively. The torsion attenuator further includes a cable coupled at a first end to the first bracket, and coupled at a second end to the second bracket. A torsion attenuator in accordance with the present invention provides that the torsional loads are distributed to the frame rail system, rather than to the individual rails. Such a torsion attenuator may be especially advantageous in suspension systems that employ air springs.

14 Claims, 4 Drawing Sheets

U.S. PATENT DOCUMENTS

| | | |
|---|---|---|
| 6,398,451 B1 * | 6/2002 | Zetterstrom ............... 403/347 |
| 6,439,587 B2 | 8/2002 | Fabris ............... 280/124.11 |
| 6,579,034 B1 * | 6/2003 | Welch et al. ............... 404/6 |
| 2001/0013693 A1 * | 8/2001 | Ross et al. ............... 280/407.1 |
| 2002/0140220 A1 * | 10/2002 | Tatsumi et al. ............... 280/781 |

FOREIGN PATENT DOCUMENTS

| | | |
|---|---|---|
| WO | WO02/053447 A2 | 7/2002 |

* cited by examiner

FRAME RAIL TORSION ATTENUATOR

BACKGROUND OF THE INVENTION

1. Field of the Invention

This invention relates to vehicle suspensions and, in particular, to a torsion attenuator for vehicle frame rails.

2. Discussion of Related Art

A conventional vehicle includes a vehicle frame having a pair of longitudinally extending frame rails that support the engine and body. The frame is supported on a plurality of ground-engaging wheels that are disposed at opposite ends of a plurality of axles. The vehicle may further contain, for example, a steer axle on which the wheels are steerable by the vehicle operator and a drive axle whose wheels are driven by the vehicle engine. Each of the axles are coupled to the vehicle frame through a suspension that dampens movements transmitted between the wheels and the vehicle frame.

One conventional vehicle suspension system includes leaf springs disposed on opposite sides of a vehicle with each leaf spring coupled to the vehicle frame at first and second ends and to an axle beam between the first and second ends. However, this suspension has several disadvantages. During braking, movement of the axle causes the leaf springs to wind up, which produces a caster change in the axle and a reduction in steering stability. Additionally, leaf springs that comprise multiple leaves may produce a harsher ride as the spring flexes.

Another conventional suspension system includes the use of air springs, instead of leaf springs. An air spring may include a reinforced rubber bag pressurized with air, the bottom of which is attached to a mount that reduces the interior volume of the bag during jounce. Such a system may further include a microprocessor-controlled system to adjust the air spring and provide a more comfortable ride.

However, the section of a frame rail where a front suspension is mounted, such as, for example, the section of a frame rail in a truck, may have a reduced flange thickness. This reduced thickness does not significantly affect the performance of traditional leaf spring suspensions. A leaf spring does not load a frame rail locally since the leaf spring has considerable span which transmits torsional loads to frame rail locations that are distant from each other. However in air spring suspensions, the compactness and tighter packaging of the suspension system may not provide the same advantage. Loads to the frame, such as one wheel or two-wheel jounce, may create torsional stress in a frame rail in an air-spring design.

The inventors herein have recognized a need for a frame rail torsion attenuator that will minimize or eliminate one or more of the above-identified deficiencies.

SUMMARY OF THE INVENTION

The present invention provides a torsion attenuator for a vehicle frame having first and second longitudinal frame rails extending substantially parallel to a longitudinal axis.

A torsion attenuator in accordance with one embodiment of the present invention includes first and second brackets coupled to the first and second frame rails, respectively. The torsion attenuator further includes a cable coupled at a first end to the first bracket, and coupled at a second end to the second bracket.

A torsion attenuator in accordance with another embodiment of the invention includes two cables. First and second brackets are coupled to the first and second frame rails, respectively. A first end of a first cable is coupled to the first bracket, and the second end of the first cable is coupled to the second bracket A first end of a second cable is coupled to the first bracket and the second end of the second cable is coupled to said second bracket.

A torsion attenuator in accordance with the present invention is advantageous. The cable draws tensile loads between the frame rails. As a result, the torsional stiffness of both frame rails as a system is higher than each individual frame rail. A torsion attenuator in accordance with the present invention provides that the torsional loads are distributed to the frame rail system, rather than to the individual rails. In addition, the use of a cable is more economic in terms of cost, space, and weight as compared with other alternatives, such as a cross-member bar welded between the frame rails. Moreover, the use of the cable provides a frame joint that is more resistant to fatigue than a welded cross-member. Further, the use of a lightweight cable reduces the bending stresses that may be present in spring seats, as compared with other, heavier alternatives.

These and other advantages of this invention will become apparent to one skilled in the art from the following detailed description and the accompanying drawings illustrating features of this invention by way of example.

DETAILED DESCRIPTION OF EMBODIMENTS OF THE INVENTION

Figure 1:
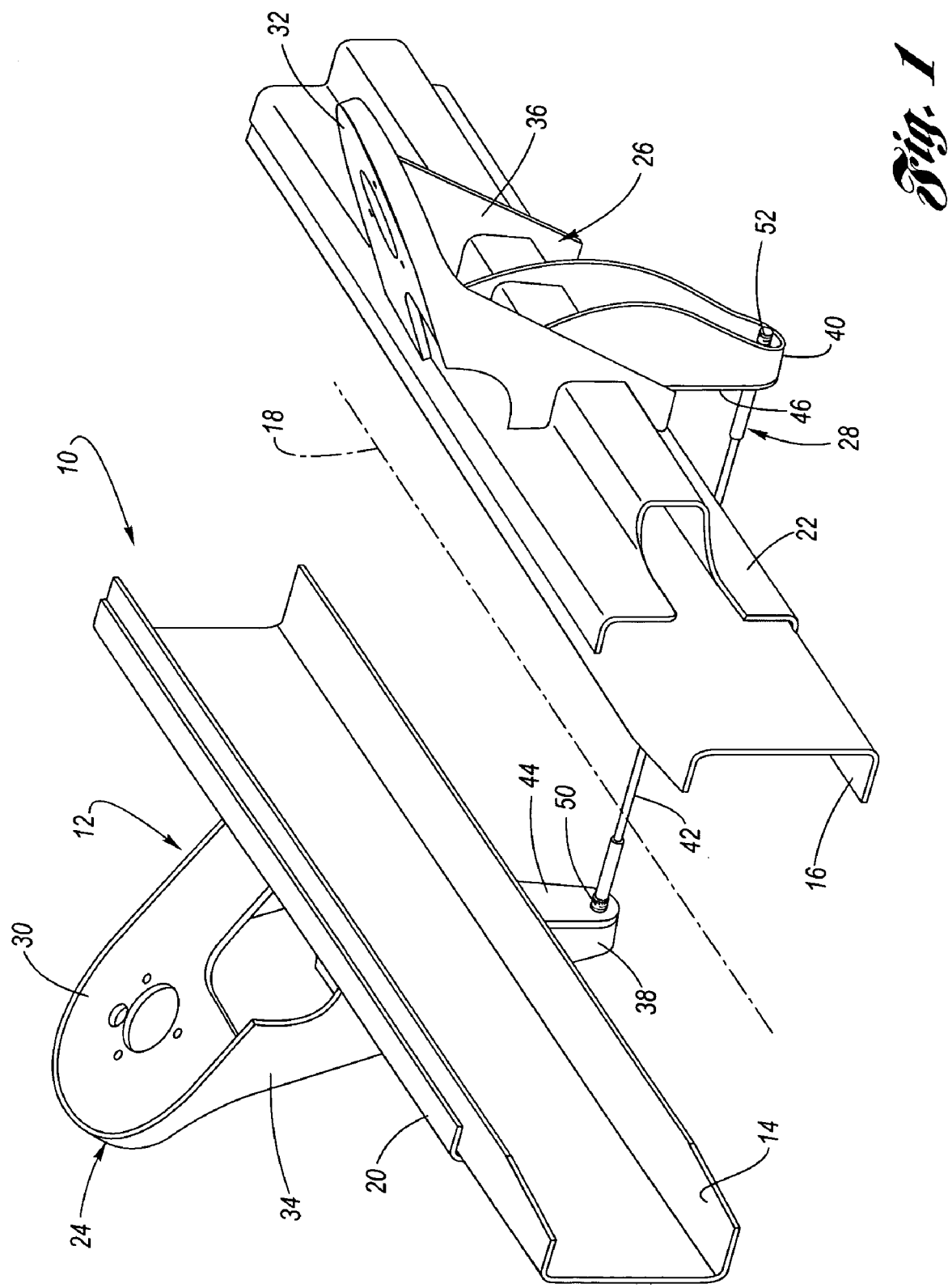
FIG. 1 is a perspective view illustrating a portion of a vehicle incorporating a torsion attenuator in accordance with an embodiment of the present invention.
Figure 2:
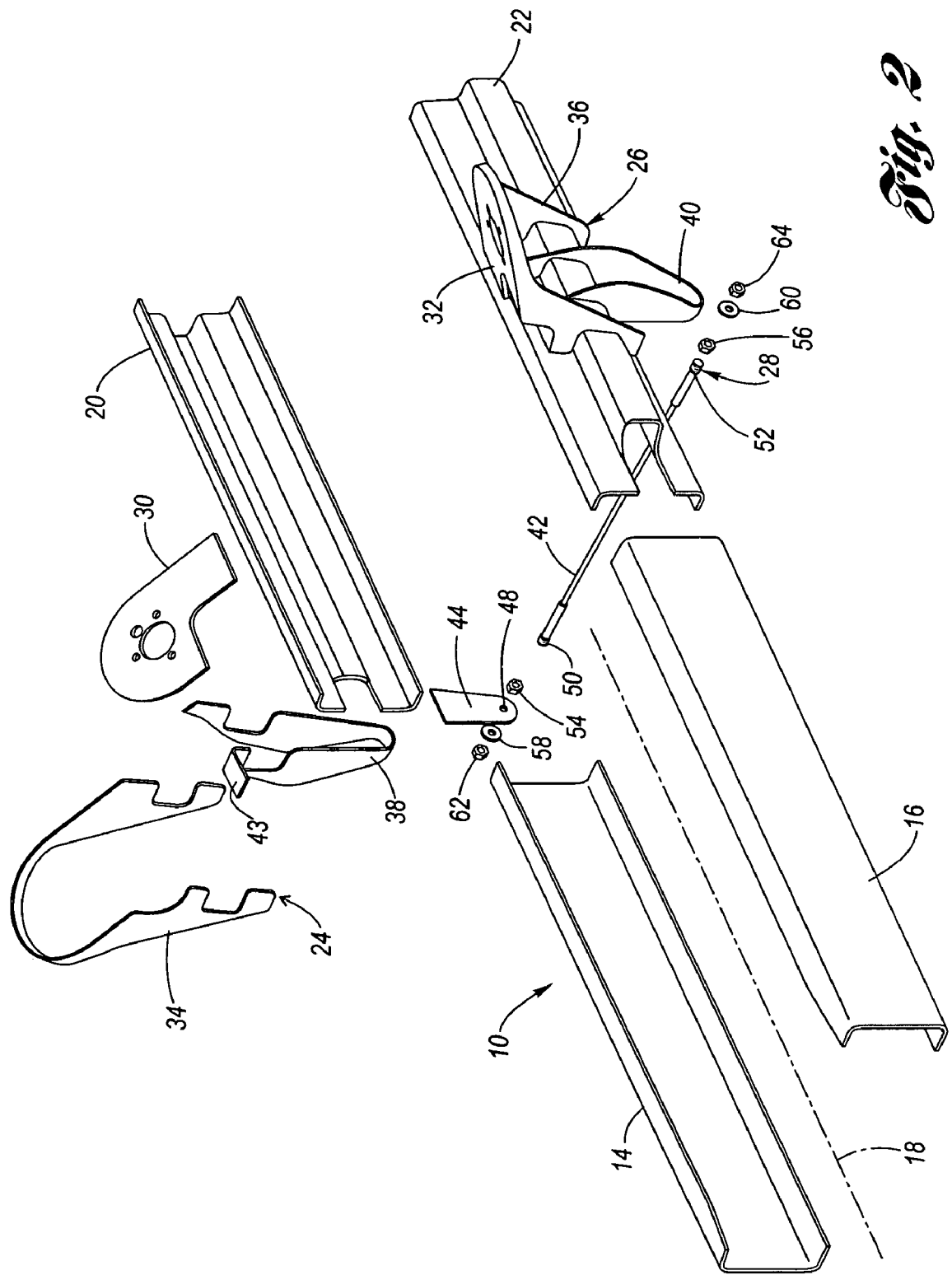
FIG. 2 is an exploded perspective view of the assembly of FIG. 1.

Referring now to the drawings wherein like reference numerals are used to identify identical components in the various views, FIGS. 1 and 2 illustrate a vehicle frame 10 and portions of a suspension 12 in accordance with the present invention. In the illustrated embodiment, frame 10 and suspension 12 are adapted for use with a heavy truck. It should be understood, however, that the present invention may find application on a wide variety of vehicles.

Frame 10 is provided to support an engine (not shown), a cab (not shown) and other components of a heavy truck. Frame 10 is conventional in the art and may be made from conventional metals and metal alloys such as steel. Frame 10 includes a pair of longitudinal rails 14, 16 extending in the direction of vehicle travel and substantially parallel to a longitudinal axis 18, which is in the longitudinal direction of the truck. Frame 10 may further include rail reinforcement members 20, 22.

Rails 14, 16 are provided to secure and align a cab on frame 10 and are conventional in the art. Rails 14, 16 are generally C-shaped in cross-section and open toward one another. Rails 14, 16 may include a plurality of apertures configured to receive bolts, screws, or other fasteners used to secure brackets and other components of suspension 12 and the vehicle.

Reinforcement members 20, 22 provide additional strength and torsional stiffness to frame 10. Members 20, 22 may be made from conventional metals and metal alloys such as steel. Members 20, 22 may be disposed about an outer surface of rails 14, 16, and may be coupled thereto using bolts, screws, welds, or other fastening means. Members 20, 22 may additionally provide a foundation on which various components of suspension 12 may be mounted.

Suspension 12 is provided to maintain the wheels of the vehicle in line with the travel of the vehicle, minimize the movement of the vehicle's body during turns and when traveling over bumps, and to provide a smooth and comfortable ride in the vehicle. Suspension 12 may be conventional in the art and may include, among other components, a pair of upper suspension control arms (not shown), a pair of lower suspension control arms (not shown), shock/spring units (not shown), spring seats 24, 26, strut rods (not shown), torsion attenuator 28, and a steering linkage (not shown).

Spring seats 24, 26 are provided as supports on which suspension springs (not shown) may be anchored. As shown, spring seats 24, 26 are configured to cooperate with a front axle assembly of a vehicle. Spring seats 24, 26 are configured to anchor air springs. However, those skilled in the art will recognize that spring seats 24, 26 may be adapted to anchor coil springs, single-leaf springs, or multi-leaf springs in various locations throughout a vehicle suspension system. Spring seats 24, 26 may also anchor other components of a vehicle suspension system, such as control arms. Spring seats 24, 26 may include plates 30, 32 and brackets 34, 36. Plates 30, 32 and brackets 34, 36 may be made from conventional metals and metal alloys such as steel. Plates 30, 32 are coupled to brackets 34, 36 through conventional means such as screws, bolts, or welding. Brackets 34, 36 may be configured to be disposed about a portion of and mounted to rail reinforcement members 20, 22. Brackets 34, 36 may be mounted to members 20, 22 by screws, bolts, welds, or other conventional means. Alternatively, brackets 34, 36 may be mounted directly to rails 14, 16 by these methods.

Torsion attenuator 28 is provided to increase the stiffness of frame 10 and minimize the torsion between rails 14 and rail 16. Attenuator 28 may include brackets 38, 40 and a cable 42.

Brackets 38, 40 are provided to receive and tautly retain cable 42. Brackets 38, 40 may be made from conventional metal and metal alloys such as steel. Brackets 38, 40 may be disposed about a portion of rail reinforcement members 20, 22, and may be mounted to members 20, 22 by bolts, screws, welds, or other conventional mounting methods. Brackets 38, 40 may be positioned within brackets 34, 36 of spring seats 24, 26 and extend from members 20, 22 in a vertical direction relative to axis 18. Additionally, an upper portion 43 of brackets 38, 40 may abut plates 30, 32 of spring seats 24, 26 for additional support. Portion 43 may additionally be mounted to plates 30, 32 by welds, screws, bolts, or other conventional methods, such that brackets 38, 40 may extend from spring seats 24, 26. Brackets 38, 40 may further include mounting plates 44, 46 for receiving ends of cable 42. Mounting plates 44, 46 may similarly be made of metal or metal alloys such as steel, and be mounted to brackets 38, 40 by welding, screws, bolts, or other conventional methods. Mounting plates 44, 46 contain an aperture 48, through which ends of cable 42 may extend.

Cable 42 is provided to receive a tensile load between rails 14, 16, increase the torsional stiffness of frame 10, and reduce the relative torsion between rails 14 and 16. Cable 42 may be a conventional cable or wire rope and be made from various grades of stainless steel or carbon steel. It should be understood, however, that material composition and method of manufacture of cable 42 may be varied without departing from the spirit of the present invention. Cable 42 may generally extend transverse to longitudinal axis 18, as shown in FIG. 1. Cable 42 may have threaded ends 50, 52. Ends 50, 52 are provided to mount cable 42 to brackets 38, 40. Ends 50, 52 may be threaded sleeves or studs which are swaged to cable 42.

Referring now to FIG. 2, jam nuts 54, 56 may be disposed about ends 50, 52. Jam nuts 54, 56 are provided to abut mounting plates 44, 46. Ends 50, 52 may then extend through mounting plates 44, 46 and be secured thereto by washers 58, 60 and heavy hex nuts 62, 64, which are disposed about the threaded ends. Jam nuts 54, 56 may be adjusted to vary the tension in cable 42 to ensure that cable 42 is taut.

Figure 3:
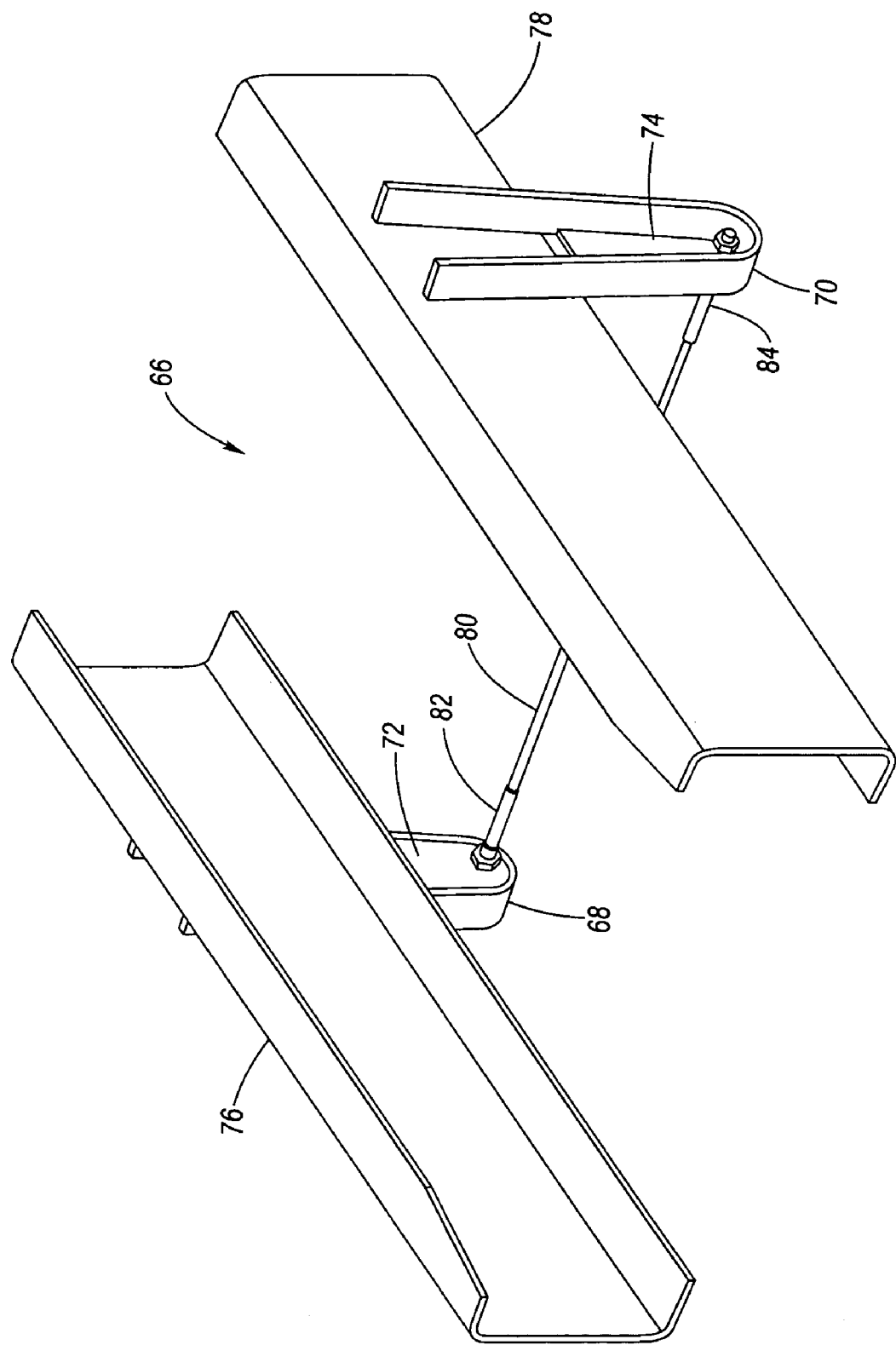
FIG. 3 is a perspective view illustrating a portion of a vehicle incorporating a torsion attenuator in accordance with another embodiment of the present invention.

Referring now to FIG. 3, an alternative embodiment of the present invention is shown for a vehicle frame 66. Brackets 68, 70 may be provided with mounting plates 72, 74, as discussed above. Brackets 68, 70 may be mounted directly to rails 76, 78, as also described above. In this embodiment, brackets 68, 70 may be mounted to rails 76, 78 irrespective of the position of spring seats (not shown). Cable 80, having threaded ends 82, 84 may be tautly mounted to brackets 68, 70 as described above.

Figure 4:
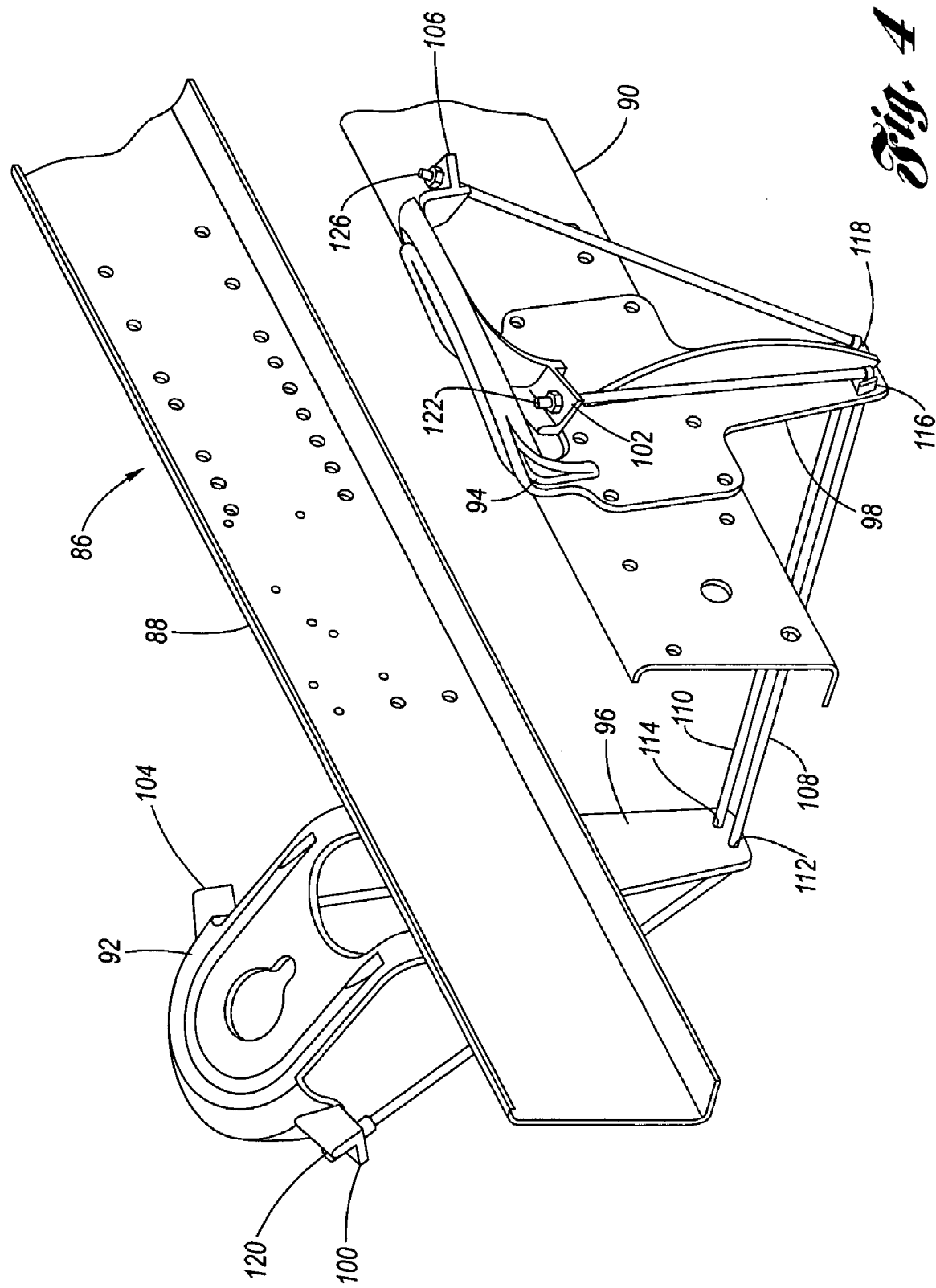
FIG. 4 is a perspective view illustrating a portion of a vehicle incorporating a torsion attenuator in accordance with another embodiment of the present invention.

Referring now to FIG. 4, still another embodiment of the present invention is shown for a vehicle frame 86. Frame 86 includes longitudinally extending frame rails 88, 90. Spring seats 92, 94 may be mounted to rails 88, 90 by bolts, screws, welding, or other conventional means. Spring seats 92, 94 may further include vertically extending bracket portions 96, 98, and mounting ears 100, 102, 104, 106.

Portions 96, 98 and mounting ears 100, 102, 104, 106 cooperate to retain tautly a pair of cables 108, 110. In particular, portions 96, 98 may each include a pair of apertures 112, 114, 116, 118 through which cables 108, 110 may extend. As shown, cables 108, 110 may extend substantially parallel to each other and generally transverse to frame rails 88, 90 between bracket portions 96, 98.

Mounting ears 100, 102, 104, 106 may include apertures for receiving cables 108, 110. Cables 108, 110 may include threaded ends 120, 122; and 124, 126, respectively. As discussed above, these ends may be threaded sleeves or studs swaged to cables 108, 110. Threaded ends 120, 122, 124, 126 may extend through and be mounted to mounting ears 100, 102, 104, 106 at locations outboard of rails 88, 90.

A torsion attenuator in accordance with the present invention represents a significant improvement as compared to conventional frame and suspension systems used in heavy truck applications. The cable draws tensile loads between the frame rails. The use of one or more cables to increase torsional stiffness of the vehicle frame may eliminate the requirement of a cross member between the vehicle frame rails. This in turn eliminates the residual stress added to the vehicle frame when such a cross member is welded to the vehicle frame rails. Moreover, the use of the cable provides a frame joint that is more resistant to fatigue than a welded cross-member. The torsion attenuator in accordance with the present invention also allows relatively easy manufacture and production in vehicle frames that employ air spring suspension systems.

While the invention has been particularly shown and described with reference to the preferred embodiments thereof, it is well understood by those skilled in the art that the various changes and modifications can be made in the invention without departing from the spirit and scope of the invention.

We claim:

1. A torsion attenuator for a vehicle having first and second longitudinal frame rails extending substantially parallel to a longitudinal axis, said torsion attenuator comprising:
   first and second brackets coupled to said first and second frame rails, respectively;
   a cable coupled at a first end to said first bracket and at a second end to said second bracket; wherein the positions of said first end and said second end are fixed relative to said first and second frame rails, respectively;
   wherein said first end of said cable further comprises a first threaded end, said second end of said cable further comprises a second threaded end, and wherein said first and second threaded ends are coupled to said first and second brackets, respectively.

2. The torsion attenuator of claim 1, wherein said cable is coupled tautly between said first and second brackets.

3. The torsion attenuator of claim 1, wherein said cable is generally transverse to said longitudinal axis.

4. The torsion attenuator of claim 1, wherein said first and second brackets extend substantially vertical to said longitudinal axis.

5. A torsion attenuator for a vehicle having first and second longitudinal frame rails extending substantially parallel to a longitudinal axis, said torsion attenuator comprising:
   first and second brackets coupled to said first and second frame rails, respectively;
   a cable coupled at a first end to said first bracket and at a second end to said second bracket; wherein the positions of said first end and said second end are fixed relative to said first and second frame rails, respectively;
   further comprising first and second spring seats coupled to said first and second frame rails, respectively, wherein said first and second brackets extend from first and second spring seats.

6. The torsion attenuator of claim 5, wherein said cable is coupled tautly between said first and second brackets.

7. The torsion attenuator of claim 5, wherein said cable is generally transverse to said longitudinal axis.

8. The torsion attenuator of claim 5, wherein said first and second brackets extend substantially vertical to said longitudinal axis.

9. A torsion attenuator for a vehicle having first and second longitudinal frame rails extending substantially parallel to a longitudinal axis, said torsion attenuator comprising:
   first and second longitudinal reinforcement members, coupled to said first and second frame rails, respectively;
   first and second brackets, coupled to said first and second reinforcement members, respectively; and
   a cable coupled at a first end to said first bracket and at a second end to said second bracket.

10. The torsion attenuator of claim 9, wherein said cable is coupled tautly between said first and second brackets.

11. The torsion attenuator of claim 9, wherein said first end of said cable further comprises a first threaded end, said second end of said further comprises a second threaded end, and wherein said first and second threaded ends are coupled to said first and second brackets, respectively.

12. The torsion attenuator of claim 9, wherein said cable is generally transverse to said longitudinal axis.

13. The torsion attenuator of claim 9, wherein said first and second brackets extend substantially vertical to said longitudinal axis.

14. The torsion attenuator of claim 9, further comprising first and second spring seats coupled to said first and second reinforcement members, respectively, wherein said first and second brackets extend from first and second spring seats.

* * * * *